United States Patent
Kitano et al.

(10) Patent No.: US 7,528,206 B2
(45) Date of Patent: May 5, 2009

(54) FIBER-CRYSTALLINE THERMOPLASTIC RESIN COMPOSITE MATERIAL AND PELLET THEREOF

(75) Inventors: Katsuhisa Kitano, Ichihara (JP); Kenji Atarashi, Bartlesville, OK (US); Yoshiaki Oobayashi, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 439 days.

(21) Appl. No.: 10/898,351

(22) Filed: Jul. 26, 2004

(65) Prior Publication Data

US 2005/0058820 A1    Mar. 17, 2005

(30) Foreign Application Priority Data

Jul. 30, 2003    (JP)    ............................. 2003-203679

(51) Int. Cl.
*C08F 110/06* (2006.01)
*C08F 8/00* (2006.01)
*C08L 99/00* (2006.01)
*C08L 23/00* (2006.01)
*C08J 3/00* (2006.01)

(52) U.S. Cl. ........................ 526/351; 524/703; 525/191; 525/197; 525/240

(58) Field of Classification Search ................. 526/348; 524/500, 502, 539, 582, 585, 580, 849, 855, 524/847; 525/55, 63, 185, 190
See application file for complete search history.

(56) References Cited

U.S. PATENT DOCUMENTS

| 4,990,550 | A | * | 2/1991 | Iwanami et al. | .............. 523/214 |
| 5,106,564 | A | * | 4/1992 | Iwanami et al. | ........ 264/211.23 |
| 5,106,893 | A | * | 4/1992 | Iwanami et al. | .............. 524/120 |
| 6,780,506 | B2 | * | 8/2004 | Oobayashi et al. | .......... 428/401 |
| 6,797,363 | B2 | * | 9/2004 | Kitano et al. | ................ 428/172 |

FOREIGN PATENT DOCUMENTS

| EP | 0333518 A2 | * | 9/1989 |
| EP | 0340040 A1 | * | 11/1989 |
| JP | 3-121146 A | | 5/1991 |
| JP | 2002-47381 A | | 2/2002 |

\* cited by examiner

*Primary Examiner*—William K Cheung
(74) *Attorney, Agent, or Firm*—Sughrue Mion, PLLC

(57) ABSTRACT

Disclosed is a composite material comprising: resin (I) comprising 10 to 99% by weight of a crystalline thermoplastic resin which is defined as component (A), and 1 to 90% by weight of a crystalline thermoplastic resin having a crystallization temperature lower than that of component (A) by at least 10° C., which resin is defined as component (B), and 5 to 400 parts by weight, based on 100 parts by weight of the resin (I), of fiber, which is defined as component (C), wherein the contents of the component (A) and the component (B) are each based on a combined content of these two components.

10 Claims, No Drawings

FIBER-CRYSTALLINE THERMOPLASTIC RESIN COMPOSITE MATERIAL AND PELLET THEREOF

BACKGROUND OF THE INVENTION

1. Field of the Invention

The present invention relates to a fiber-crystalline thermoplastics composite material and a pellet thereof. In particular, the invention relates to a fiber-crystalline thermoplastic resin composite material from which a molded article superior in mechanical strength and in appearance can be obtained, and to a pellet of the composite material.

2. Description of the Related Art

As a measure for improving mechanical strength of crystalline thermoplastic resin such as rigidity and impact strength, it is conventionally known to incorporate filler, glass fiber or the like into the resin.

For example, IDE Fumio, "Interface Control and Design of Composite Material", Sigma Shuppan Co., Chapters 6, 7 and 8 (1995) discloses a crystalline thermoplastic resin composition having a mechanical strength enhanced by use of glass fiber, carbon fiber or organic fiber.

In addition, as a polyolefin resin composition for molding which has an improved mechanical strength, JP-A-3-121146 discloses a polyolefin resin composition for use in long-fiber-reinforced molding comprising a resin component composed of polyolefin and modified olefin-based polymer and reinforcing fiber, wherein the fiber has a length of at least 2 mm in the resin.

However, further improvement is demanded for appearance of molded articles obtained from the fiber-reinforced crystalline thermoplastic resin compositions disclosed in the above publication ("Interface Control and Design of Composite Material") or the patent publication (JP-A-3-121146) or pellets obtained from the resin composition.

JP-A-2002-47381 discloses, as a fiber-reinforced polyolefin resin composition superior in mechanical properties and appearance of molded articles produced therefrom, a fiber-reinforced polyolefin resin composition comprising polyolefin, reinforcing fiber and petroleum resin. However, for molded articles made from the fiber-reinforced polyolefin resin composition disclosed in the above patent publication (JP-A-2002-47381) or pellets thereof, inhibition of decrease of their strength and improvement of their appearance are desired.

SUMMARY OF THE INVENTION

The object of the present invention is to provide a fiber-crystalline thermoplastic resin composite material from which a molded article superior in mechanical strength and in appearance can be obtained and a pellet of the composite material.

The present invention is directed to a composite material comprising: resin (I) comprising 10 to 99% by weight of a crystalline thermoplastic resin which is defined as component (A), and 1 to 90% by weight of a crystalline thermoplastic resin having a crystallization temperature lower than that of component (A) by at least 10° C., which resin is defined as component (B), and 5 to 400 parts by weight, based on 100 parts by weight of the resin (I), of fiber, which is defined as component (C), wherein the contents of the component (A) and the component (B) are each based on a combined content of these two components.

In addition, the present invention is also directed to a composite material comprising: resin (II) comprising a crystalline thermoplastic resin which is defined as component (A), a crystalline thermoplastic resin having a crystallization temperature lower than that of component (A) by at least 10° C., which is defined as component (B), and a modified polyolefin resin partially or entirely modified with an unsaturated carboxylic acid or its derivative, which resin is defined as component (D), and 5 to 400 parts by weight, based on 100 parts by weight of the resin (II), of fiber, which is defined as component (C), wherein in the resin (II) the weight proportions of the component (A) and the component (B) are, respectively, 10 to 99% by weight and 1 to 90% by weight, each based on a combined amount of these two components, and wherein the ratio of the weight of the component (D) to a combined weight of the components (A) and (B) is from 0.1/99.9 to 20/80.

Moreover, the present invention is also directed to pellet obtained from the above composite materials, and to molded articles obtained from the composite materials or pellets.

DESCRIPTION OF THE PREFERRED EMBODIMENTS

The crystalline thermoplastic resin which is defined as component (A) used with the present invention is a thermoplastic resin having a crystallinity of 10% or more than and preferably is a thermoplastic resin having a crystallinity of 20% or more.

As described in OKAMURA, Seizo et al., "Introduction to Macromolecular Chemistry" published by Kagaku Dojin (1970) and "New Edition, Macromolecule Analysis Handbook" edited by The Chemical Society of Japan, The Meeting of Macromolecule Analysis, published by Kinokuniya Co., Ltd. (1995), for the measurement of crystallinity, any known method may be used such as the X-ray method, the density method, the infrared absorption method, the NMR method and calorimetric methods.

Examples of the component (A) used in the present invention include polyolefin resin such as polypropylene and polyethylene resin, polyester resin such as polyethylene terephthalate and polybutylene terephthalate, polyamide resin and polyphenylene sulfide resin. These resins may be used singly or as a blend of two or more of them.

The component (A) used in the present invention preferably is polyolefin resin, and more preferably is polypropylene resin.

In the present invention, examples of the polyamide used as the component (A) include nylon 6, nylon 46, nylon 66, nylon 11, nylon 12, nylon 6•10 and nylon 6•12 are given for polyamide resin used. These polyamide resins may be used singly or as a blend of two or more of them.

In the present invention, aromatic polyamide may be employ as polyamide resin used as the component (A). Preferred is thermoplastic copolyamide containing an aromatic component. Examples thereof include polyamides which can be produced by melt polymerization and which contain aromatic amino acid and/or aromatic dicarboxylic acid as a major constituent. Examples of the aromatic dicarboxylic acid include p-aminomethylbenzoic acid, p-aminoethylbenzoic acid, terephthalic acid and isophthalic acid. Examples of diamine which serves as other constituent include hexamethylene diamine, undecamethylene diamine, dodecamethylene diamine, 2,2,4-/2,4,4-trimethylhexamethylene diamine, metaxylylene diamine, paraxylylene diamine, bis(p-aminocyclohexyl)methane, bis(p-aminocyclohexyl)propane, bis(3-methyl, 4-aminocyclohexyl)methane, 1,3-bis(aminomethyl) cyclohexane and 1,4-bis(aminomethyl)cyclohexane.

One specific example of the thermoplastic copolyamide containing an aromatic component is polyhexamethylene isophthalamide (nylon 6I).

In the present invention, the polyester resin to be used as the component (A) preferably is aromatic polyester resin, and more preferably is polyester resin whose major acid component and major glycol component are aromatic dicarboxylic acid and aliphatic glycol, respectively. Examples of the aromatic dicarboxylic acid include terephthalic acid, naphthalene dicarboxylic acid, isophthalic acid, diphenyl ketone dicarboxylic acid and anthracene dicarboxylic acid. Examples of the aliphatic glycol include polymethylene glycols having from 2 to 10 carbon atoms such as ethylene glycol, trimethylene glycol, tetramethylene glycol, pentamethylene glycol and hexamethylene glycol and decamethylene glycol, and aliphatic diols such as cyclohexanedimethanol.

In the present invention, examples of the polyolefin resin to be used as the component (A) include polypropylene resin, polyethylene resin, and α-olefin resin which is composed mainly of α-olefin having four or more carbon atoms. The polyolefin resin preferably is a polypropylene resin. These polyolefin resins may be used singly or as a blend of two or more of them.

Examples of the polypropylene resin include propylene homopolymers, ethylene-propylene random copolymers, propylene-α-olefin random copolymers, and propylene block copolymers obtained by homopolymering propylene and copolymerizing ethylene and propylene.

Examples of the polyethylene resin include ethylene homopolymers, ethylene-propylene random copolymers and ethylene-α-olefin random copolymers.

Examples of the α-olefin resin which is composed mainly of α-olefin having four or more carbon atoms include α-olefin-propylene random copolymers and α-olefin-ethylene random copolymers.

Examples of the α-olefin having four or more carbon atoms which is used when the component (A) is a polyolefin resin include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene. Preferred are 1-butene, 1-pentene, 1-hexene and 1-octene.

The crystalline thermoplastic resin defined as component (B) which is used in the present invention is a crystalline thermoplastic resin having a crystallization temperature (Tc) lower than that of the component (A) by at least 10° C.

The component (B) is ordinarily a thermoplastic resin having a crystallinity of 10% or more. Preferably, the component (B) has a crystallinity of from 10 to 90%. Like the component (A), the component (B) may be measured for its crystallinity by a known method such as the X-ray method, the density method, the infrared absorption method, the NMR method and calorimetric methods as described in OKAMURA, Seizo et al., "Introduction to Macromolecular Chemistry" published by Kagaku Dojin (1970) and "New Edition, Macromolecule Analysis Handbook" edited by The Chemical Society of Japan, The Meeting of Macromolecule Analysis, published by Kinokuniya Co., Ltd. (1995).

Like the component (A), examples of the component (B) include polyolefin resin, polyester resin, polyamide resin and polyphenylene sulfide resin. These resins may be used singly or as a blend of two or more of them.

The component (B) is preferably polyolefin resin. Examples of the polyolefin resin include polypropylene resin and polyethylene resin. The polypropylene resin is preferable.

The crystallization temperature (Tc) of the component (B) used in the present invention is a crystallization temperature which is lower than the crystallization temperature (Tc) of the component (A) by at least 10° C. Ordinarily, the component (B) is a crystalline thermoplastic resin having a crystallization temperature lower than that of the component (A) by from 10 to 110° C. From the viewpoints of the appearance of a molded article to be obtained or the ease of molding production of molded articles, the crystallization temperature of the component (B) is preferably lower than that of the component (A) by from 15 to 110° C., more preferably by from 20 to 110° C., and particularly preferably by from 30 to 100° C.

The crystallization temperature (Tc) is defined as a peak temperature of a peak whose calorific value is the largest in the crystallization exothermic curve obtained by the following method.

Using a differential scanning calorimeter (DSC-7, for rapid cooling, manufactured by PerkinElmer, Inc.), a 10-mg sample piece was melted at 220° C. for five minutes under nitrogen atmosphere. When the sample was not melted at 220° C., its temperature was further increased and it was melted at 300° C. for five minutes. After the sample was melted, its temperature was decreased to 40° C. at a rate of 5° C./min and a crystallization exothermic curve was measured. In the resulting crystallization exothermic curve, the peak temperature of a peak whose calorific value is the largest is defined as a crystallization temperature (Tc). Moreover, after the temperature, the temperature of the sample was increased at a rate of 5° C./min and a melting endothermic curve was measured. The peak temperature of a peak whose endotherm is the largest in the melting endothermic curve was defined as a melting point (Tm). It is noted that the temperature at which indium (In) started to melt which was measured by means of the measuring instrument at a temperature increase rate of 5° C./min was 156.6° C.

The crystallization temperature (Tc) of the component (B) used in the present invention is preferably 100° C. or lower, more preferably 0° C. to 100° C., still more preferably from 0° C. to 95° C., and particularly preferably from 30° C. to 90° C. from the viewpoints of the appearance of molded articles to be obtained or the ease of molding production of molded articles.

When the component (B) used in the present invention is polypropylene resin, the melt flow rate (MFR) of the polypropylene resin used is preferably from 1 to 300 g/10 min, more preferably from 2 to 250 g/10 min, and particularly preferably from 4 to 200 g/10 min from the viewpoints of ease of producing and molding of molded articles and mechanical strength such as rigidity and impact strength. The melt flow rate (MFR) is determined at 230° C. under a load of 21.2 N in accordance with ASTM D1238.

When the component (B) used in the present invention is polypropylene resin, the structure of the polypropylene resin used may be any of an isotactic structure, a syndiotactic structure and a tactic structure each disclosed in "Polypropylene Handbook" edited by Edward P. Moore, Jr., published by Kogyo Chosakai Publishing Co. (1998). A polypropylene having these structures in combination is also available. Of these structures, the syndiotactic structure is preferred from the viewpoint of appearance of molded articles.

The polypropylene which has a syndiotactic structure is a polypropylene resin having a syndiotactic pentad fraction [rrrr] of from 0.3 to 0.9, preferably from 0.5 to 0.9, and more preferably from 0.7 to 0.9, wherein the syndiotactic pentad fraction is a value obtained by dividing the intensity of a peak observed at 20.2 ppm, based on tetramethylsilane in a $^{13}$C-NMR spectrum measured at 135° C. in a 1,2,4-trichlorobenzene solution, by the sum total of the intensities of the peaks assigned to methyl groups in propylene units. Necessary assignment of peaks were conducted according to A. Zambelli et al, Macromolecules, 6, 925 (1973).

From the viewpoint of mechanical strength such as impact strength and rigidity, at least one of the components (A) and (B) used in the present invention may be modified partially or entirely with an unsaturated carboxylic acid or its derivative. An unsaturated carboxylic acid or its derivative for use in the preparation of a modified polyolefin resin (component (D)), which will be described later, may be used as the unsaturated carboxylic acid or its derivative for the modification of the components (A) and (B).

The methods for producing the crystalline thermoplastic resins used in the present invention, which are the components (A) and (B), maybe the methods utilizing solution polymerization, slurry polymerization, bulk polymerization, gas phase polymerization, or the like which are disclosed in "New Polymer Production Process" edited by Yasuji SAEKI, published by Kogyo Chosakai Publishing Co. (1994), Eiichiro TAKIYAMA, "Polyester Resin" published by The Nikkan Kogyo Shimbun, Ltd. (1970), and "Polyamide Resin" edited by Osamu FUKUMOTO, published by The Nikkan Kogyo Shimbun, Ltd. (1970). The method may be either a method utilizing only one polymerization technique or a method utilizing a combination of two or more polymerization techniques.

When the components (A) and (B) are polyolefin resins, the process for producing the polypropylene resins may be methods utilizing solution polymerization, slurry polymerization, bulk polymerization, gas phase polymerization or the like described in "New Polymer Production Process" edited by Yasuji SAEKI, published by Kogyo Chosakai Publishing Co. (1994), JP-A-4-323207, JP-A-61-287917 and so on. The method may be either a method utilizing only one polymerization technique or a method utilizing a combination of two or more polymerization techniques.

Desirable examples of the catalyst to be used for the preparation of polyolefin resin include multiple-site catalysts obtained by using a solid catalyst component containing a titanium atom, a magnesium atom and a halogen atom and single-site catalysts obtained by using a metallocene complex.

When the components (A) and (B) are polypropylene resins, the process for producing the polypropylene resins may be methods utilizing solution polymerization, slurry polymerization, bulk polymerization, gas phase polymerization or the like described in "New Polymer Production Process" edited by Yasuji SAEKI, published by Kogyo Chosakai Publishing Co. (1994), JP-A-4-323207, JP-A-61-287917 and so on. The method may be either a method utilizing only one polymerization technique or a method utilizing a combination of two or more polymerization techniques.

Desirable examples of the catalyst to be used for the preparation of polypropylene resin include multiple-site catalysts obtained by using a solid catalyst component containing a titanium atom, a magnesium atom and a halogen atom and single-site catalysts obtained by using a metallocene complex.

The method for producing a polypropylene resin having a syndiotactic structure is disclosed, for example, in JP-A-5-17589 and JP-A-5-131558.

The fiber used in the present invention, which is component (C), may be inorganic fiber, organic fiber or natural fiber. Examples thereof include glass fiber, carbon fiber, metal fiber, aromatic polyamide fiber, kenaf fiber, bamboo fiber, polyester fiber, nylon fiber, jute fiber, ramie fiber and cellulose fiber. Among these preferred are glass fibers.

From the viewpoints of improvement in mechanical strength such as rigidity and impact resistance and ease of producing or molding of molded articles, the weight average length of the fiber (component (C)) is preferably from 2 to 100 mm, and particularly preferably from 2 to 50 mm. The weight average length of the fiber (component (C)) used herein refers to the length of the fiber in the composite material of the present invention, which length is a weight average length measured by the method disclosed in JP-A-2002-5924.

For binding the fiber (component (C)), a binder may be used. Examples of the binder include polyolefin resin, polyurethane resin, polyester resin, acrylic resin, epoxy resin, starch and vegetable oil. Moreover, acid-modified polyolefin resin, surface treating agents and lubricants such as paraffin wax may also be incorporated.

In order to improve wettability or adhesiveness of the fiber (component (C)) with the thermoplastic resin(s) (component (A) and/or component (B)), one may treat the fiber with a surface treating agent prior to use of the fiber. Examples of the fiber treating agent include silane-type coupling agents, titanate-type coupling agents, aluminum-containing coupling agents, chromium-containing coupling agents, zirconium-containing coupling agents and borane-containing coupling agents. Silane-type coupling agents and titanate-type coupling agents are preferable. Silane-type coupling agents are especially preferable.

Examples of the silane-type coupling agents include triethoxysilane, vinyltris(β-methoxyethoxy)silane, γ-methacryloxypropyltrimethoxysilane, γ-glycidoxypropyltrimethoxysilane, β-(3,4-epoxycyclohexyl)ethyltrimethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane. Among these, preferred are aminosilanes, especially γ-aminopropyltriethoxysilane and N-β-(aminoethyl)-γ-aminopropyltrimethoxysilane.

The method for treating the fiber (component (C)) with a surface treatment agent may be methods conventionally employed, for example, the aqueous solution method, the organic solvent method and the spray method.

The modified polyolefin resin (component (D)) may be:

(1) a modified polyolefin resin obtained by graft polymerizing an unsaturated carboxylic acid and/or its derivative to an olefin homopolymer, (2) a modified polyolefin resin obtained by graft polymerizing an unsaturated carboxylic acid and/or its derivative to a copolymer derived from at least two kinds of olefins, (3) a modified polyolefin resin obtained by graft polymerizing an unsaturated carboxylic acid and/or its derivative to a block copolymer obtained by homopolymerization of olefin, followed by copolymerization of at least two kinds of olefins, and (4) a modified polyolefin resin obtained by copolymerizing at least one kind of olefin and an unsaturated carboxylic acid and/or its derivative.

The modified polyolefin resin (component (D)) may use alone or in combination of two or more or them.

In the production of the modified polyolefin resin (component (D)), various methods, e.g. the methods described, for example, in "Practical Design of Polymer Alloy" Fumio IDE, Kogyo Chosakai Publishing Co. (1996), Prog. Polym. Sci., 24, 81-142 (1999) and Japanese Patent Laid-Open No. 2002-308947 may be employed. Concretely, any of the solution method, the bulk method and the melt-kneading method may be used. These methods may be employed in combination.

Examples of the unsaturated carboxylic acids for use in the preparation of the modified polyolefin resin (component (D)) include maleic acid, fumaric acid, itaconic acid, acrylic acid and methacrylic acid.

The derivatives of the unsaturated carboxylic acids may be, for example, acid anhydrides, esters, amides, imides and metal salts derived from the unsaturated carboxylic acids. Specific examples thereof include maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, monoethyl maleate, diethyl maleate, monomethyl fumarate, dimethyl fumarate, acrylamide, methacrylamide, maleic acid monoamide, maleic acid diamide, furaric acid monoamide, maleimide, N-butylmaleimide and sodium methacrylate. Further, a compound which dehydrates to form an unsaturated carboxylic acid during the step of graft polymerization to polypropylene, such as citric acid and malic acid, may also be used.

Examples of preferable unsaturated carboxylic acids and their derivatives include glycidyl acrylate, glycidyl methacrylate and maleic anhydride.

The modified polyolefin resin (component (D)) preferably is:

(5) a modified polyolefin resin obtained by graft polymerizing maleic anhydride to a polyolefin resin made up mainly of structural units derived from ethylene and/or propylene; and (6) a modified polyolefin resin obtained by copolymerizing glycidyl methacrylate or maleic anhydride with olefin composed mainly of ethylene and/or propylene.

The content of the structural units of the modified polyolefin resin (component (D)) derived from an unsaturated carboxylic acid and/or its derivative preferably is from 0.1 to 10% by weight from the viewpoint of mechanical strength such as impact resistance, fatigue characteristics and rigidity.

When the modified polyolefin resin (component (D)) is (4) a modified polyolefin resin obtained by random copolymerization or block copolymerization of at least one olefin and an unsaturated carboxylic acid and/or its derivative, the content of the units derived from the unsaturated carboxylic acid and/or its derivative preferably is from 3 to 10% by weight.

When the modified polyolefin resin (component (D)) is:

(1) a modified polyolefin resin obtained by graft polymerizing an unsaturated carboxylic acid and/or its derivative to an olefin homopolymer, (2) a modified polyolefin resin obtained by graft polymerizing an unsaturated carboxylic acid and/or its derivative to a copolymer derived from at least two kids of olefins, or (3) a modified polyolefin resin obtained by graft polymerizing an unsaturated carboxylic acid and/or its derivative to a block copolymer obtained by homopolymerization of olefin followed by copolymerization of at least two kinds of olefins, the content of the units derived from the unsaturated carboxylic acid and/or its derivative preferably is from 0.1 to 10% by weight.

When the composite material of the present invention is a composite material that comprises resin (I) comprising a crystalline thermoplastic resin which is defined as component (A) and a crystalline thermoplastic resin having a crystallization temperature lower than that of the component (A) by at least 10° C., which is defined as component (B), and fiber which is defined as component (C), the weight proportion of the component (A) and that of the component (B) are, respectively, from 10 to 99% by weight and from 1 to 90% by weight, each based on a combined amount of both components.

From the viewpoints of improvement in mechanical strength such as rigidity and impact resistance and appearance of molded articles, the weight proportion of the component (A) and that of the component (B) are, respectively, from 10 to 98% by weight and from 2 to 90% by weight, and more preferably from 15 to 96% by weight and from 4 to 85% by weight.

The content of the fiber (component (C)) is from 5 to 400 parts by weight based on 100 parts by weight of resin (I). From the viewpoints of improvement in mechanical strength such as rigidity and impact resistance and ease of producing and molding of molded articles, it preferably is from 10 to 300 parts by weight, and particularly preferably from 10 to 240 parts by weight.

When the composite material of the present invention is a composite material that comprises resin (II) comprising a crystalline thermoplastic resin which is defined as component (A), a crystalline thermoplastic resin having a crystallization temperature lower than that of component (A) by at least 10° C., which is defined as component (B), and a modified polyolefin resin partially or entirely modified with an unsaturated carboxylic acid or its derivative, which is defined as component (D), and fiber which is defined as component (C), the weight proportions of the component (A) and the component (B) in the resin (II) are, respectively, 10 to 99% by weight and 1 to 90% by weight, each based on a combined amount of both components. From the viewpoints of improvement in mechanical strength such as rigidity and impact resistance and appearance of molded articles, the weight proportion of the component (A) and that of the component (B) are, respectively, from 10 to 98% by weight and from 2 to 90% by weight, and more preferably from 15 to 96% by weight and from 4 to 85% by weight.

The ratio of the weight of the component (D) to a combined weight of the components (A) and (B) is from 0.1/99.9 to 20/80. From the viewpoint of improvement in mechanical strength such as rigidity and impact strength and in fatigue characteristics and the viewpoint of ease of molding and producing molded articles, it is preferably from 0.1/99.9 to 20/80, more preferably from 0.3/99.7 to 20/80, and particularly preferably from 0.5/99.5 to 20/80.

The content of the fiber (component (C)) is from 5 to 400 parts by weight based on 100 parts by weight of the resin (II) containing the components (A), (B) and (D). From the viewpoint of improvement in mechanical strength such as rigidity and impact strength and the viewpoint of ease of producing and molding of molded articles, it is preferably from 10 to 300 parts by weight, and particularly preferably from 10 to 240 parts by weight.

The composite material of the present invention may, if necessary, be incorporated with at least one elastomer. Examples of the elastomer include ethylene-α-olefin random copolymers, ethylene-α-olefin nonconjugated polyene random copolymers, hydrogenated block copolymers, other elastic polymers and mixtures thereof.

The composite material may, according to the purpose, contain various substances which are generally added to thermoplastic resin, for example, stabilizers, e.g. antioxidants, heat stabilizers, neutralizing agents and ultraviolet absorbers, foam inhibitors, flame retarders, flame retarding aids, dispersing agents, antistatic agents, lubricants, antiblocking agents, e.g. silica, colorants, e.g. dyestuffs and pigments, plasticizers, nucleating agents and crystallization accelerators.

Furthermore, it may also contain tabular or granular inorganic compounds such as glass flakes, mica, glass powder, glass beads, talc, clay, alumina, carbon black and wollastonite, or whiskers.

As a method for producing the composite material of the present invention, various known methods for producing composite materials comprising thermoplastic resins and fibers may be employed. Examples thereof include a method in which all ingredients are mixed or some of the ingredients are separately mixed in combination to form a homogeneous mixture and the mixture is melt kneaded and a pultrusion process. A method for obtaining the homogeneous mixture may be a method of homogeneously mixing with a Henschel mixer, a ribbon blender, a blender or the like. A method of melt kneading may be a method using a Banbury mixer, a plastomill, a Brabender plastograph, a single screw or twin screw extruder, or the like.

Of these production methods, the pultrusion method is preferred because of the ease of producing the composite material and the mechanical strength such as rigidity and impact strength of molded article obtained from the composite material. The pultrusion method is basically a method in which a continuous fiber bundle is impregnated with resin while being pulled and examples thereof include:

(1) a method in which a fiber bundle is impregnated with resin by passing the fiber bundle through an impregnation bath containing an emulsion, suspension or solution of the resin;

(2) a method in which a fiber bundle is impregnated with resin in a manner such that the resin is attached to the fiber bundle by spraying a powder of the resin to the fiber bundle or passing the fiber bundle through a bath containing the powder and then the resin is melted; and (3) a method in which a fiber bundle is impregnated with resin by passing the fiber bundle in a crosshead and simultaneously supplying the resin to the crosshead from an extruder or the like.

Preferred is the method (3) using a crosshead. Particularly preferred is a method using a crosshead of the type disclosed in JP-A-3-272830 and so on.

In the pultrusion method, the impregnation of the fiber bundle with resin may be done either in a single step or in two or more steps. In addition, pellets produced by the pultrusion method and pellets produced by the melt-kneading method may be blended together.

The pellet of the present invention is a pellet obtained from any of the composite materials of the present invention. In order to obtain a molded article having superior strength at a good injection moldability when applying a pellet for injection molding, it is desirable that the pellet have a length of from 2 to 50 mm and that the length of the fiber (component (C)) contained in the pellet be equal to the length of the pellet.

In the pellet of the present invention, "the length of the fiber (component (C)) contained in the pellet is equal to the length of the pellet" means that the weight average length of the fiber (C) in the pellet measured by the method disclosed in JP-A-2002-5924 is from 90 to 110% of the length of the pellet.

The molded article of the present invention is a molded article which is obtained from any of the composite materials of the present invention or the pellet of the present invention.

The molding method may be, for example, injection molding, injection compression molding, gas assist molding and extrusion forming.

In particular, when the molded article of the present invention is a molded article obtained from any of the composite material of the present invention or its pellet by injection molding, the weight average length of the fiber (component (C)) in the molded article is preferably from 1 to 10 mm from the viewpoints of the mechanical strength and the durability of the molded article.

A molded article containing therein fiber (component (C)) having a weight average length of from 1 to 10 mm can be produced by injection molding any of the composite materials or its pellet under ordinary processing conditions. Desirable processing conditions include application of a low back pressure during the molding, use of a molding machine having a screw with a deep groove, use of a low injection speed during the molding, use of a mold having a wide flow passage formed in the mold, and use of a molding machine having a nozzle with a large outlet diameter.

The molded article of the present invention can be used as automotive plastic parts such as exterior parts which are required to have good mechanical strength, durability and appearance, e.g. a fender, an over-fender, a grille guard, a cowl louver, a wheel cap, a side protector, a side mall, a side lower skirt, a front grille, a side step, a roof rail, a rear spoiler and a bumper; interior parts which are required to have good heat-resistant rigidity, e.g. instrument panel lower parts and trims; engine components, e.g. a bumper beam, a cooling fan, a fan shroud, a lamp housing, a car heater case, a fuse box and an air cleaner case.

In addition, it can be used as parts of various kinds of appliances such as housings of machines e.g. electromotive tools, cameras, video cameras, microwave ovens, electric kettles, electric pots, cleaners, personal computers, copying machines, printers, FDD and CRT; parts of various machines such as pump casings; and parts of structures such as tanks, piping and constructive forms.

EXAMPLES

The present invention will be described below by referring to examples and comparative examples. The invention, however, is not limited to the examples.

The method for producing the samples for evaluations used in the examples or the comparative examples is described below.

(1) Method for Preparing Long-fiber-reinforced Pellets

According to the method described in JP-A-3-121146, fiber-resin composite material pellets (E-1), (E-3) and (E-4) of the compositions shown in Table 1 and long-fiber-reinforced pellets (E-2) of the composition shown in Table 3 were prepared. In the preparations, the impregnation temperature was 270° C. and the take-up rate was 13 m/min. The glass fiber used had a diameter of 16 μm.

(2) Method for Preparing a Sample for Evaluation

Examples 1, 3 and 4 and Comparative Examples 1, 3 and 4

Using a molding machine specified below manufactured by Nippon Steel Works, a sample for measuring gloss, samples for measuring tensile strength, and samples for IZOD impact strength were prepared by blending the pellets (E-1) with an additional ingredient as shown in Table 2 and then conducting injection molding under the conditions shown below. As a sample for measuring gloss, a plate sized 150 mm by 150 mm and 3 mm in thickness was prepared and evaluated. In the blending, the mixture was colored in black by addition of one part by weight, based on 100 parts by weight of the raw materials, of pigment masterbatch (carbon black content: 14% by weight).

Molding Machine:
  Molding machine J150E manufactured by The Japan Steel Works, Ltd.
    Clamping force: 150 t
    Screw: Screw with deep channel for long fibers
    Screw diameter: 46 mm
    Screw L/D: 20.3
Molding Conditions
    Cylinder temperature: 250° C.
    Mold temperature: 50° C.
    Back pressure: 0 MPa Example 2 and Comparative Example 2

Using a molding machine specified below manufactured by Ube Machinery Corp. Ltd., a sample for measuring gloss (plate sized 130 mm by 120 mm, 3 mm in thickness) was prepared by blending the pellets (E-2) with an additional ingredient as shown in Table 4 and then conducting injection molding. In the blending, the mixture was colored in black by addition of one part by weight, based on 100 parts by weight of the raw materials, of pigment masterbatch (carbon black content: 14% by weight).

Molding Machine:
  Molding machine MD350S-III manufactured by Ube Machinery Corp., Ltd.
    Clamping force: 170 t
    Screw: General purpose screw
    Screw diameter: 45 mm
    Screw L/D: 18
Molding Conditions
    Cylinder temperature: 250° C.
    Mold temperature: 40° C.
    Back pressure: 20 MPa
  In the examples and the comparative examples, physical properties were measured according to the methods shown below.

(1) MFR (g/10 min)
  MFR was measured under the following conditions per ASTM D1238.
  Measuring temperature: 230° C.
  Load: 21.2 N (2) Tensile Strength (MPa)
  Tensile strength was measured under the following conditions per ASTM D638.
  Measuring temperature: 23° C.
  Sample thickness: 3.2 mm
  Tensile rate: 10 mm/minute (3) IZOD impact strength (KJ/m$^2$)
  IZOD impact strength was measured per ASTM D256 under the following conditions.
  Measuring temperature: 23° C.
  Sample thickness: 6.4 mm (with a V notch)

(4) Gloss (%)
  Gloss was measured under the following condition per ASTM D523.
  Angle of incidence: 60°

(5) Crystallization Temperature (Tc, ° C.)
  Using a differential scanning calorimeter (DSC-7, for rapid cooling, manufactured by PerkinElmer, Inc.), a 10-mg sample piece was melted at 220° C. for five minutes under nitrogen atmosphere. After that, the temperature was decreased at a rate of 5° C./min to 40° C. and a crystallization exothermic curve was measured. In the resulting crystallization exothermic curve, the peak temperature of a peak whose calorific value is the largest is defined as a crystallization temperature (Tc). After that, the temperature of the sample was increased at a rate of 5° C./min and a melting endothermic curve was measured. The peak temperature of a peak whose endotherm is the largest in the melting endothermic curve was defined as a melting point (Tm). It is noted that the temperature at which indium (In) started to melt which was measured by means of the measuring instrument at a temperature increase rate of 5° C./min was 156.6° C.

(6) Syndiotactic Pentad Fraction [rrrr]
  A sample was dissolved in 1,2,4-trichlorobenzene and then was subjected to the measurement of $^{13}$C-NMR at 135° C. From a spectrum obtained, a syndiotactic pentad fraction [rrrr] was calculated by dividing the intensity of a peak observed at 20.2 ppm, based on tetramethylsilane, by the sum total of the intensities of the peaks assigned to methyl groups in propylene units. Necessary assignment of peaks were conducted according to A. Zambelli et al, Macromolecules, 6, 925 (1973).

Example 1

According to the method described in JP-A-3-121146, long-fiber-reinforced pellets (E-1) were prepared in a composition given in Table 1. The pellets contained glass fiber in a content of 50% by weight and were 9 mm long. The crystalline thermoplastic resin (A-1) used was a propylene homopolymer (MFR=80 g/10 min, crystallization temperature (Tc)=127° C.) and the modified polyolefin resin (D-1) used was a maleic anhydride-modified polypropylene (MFR=60 g/10 min, maleic anhydride graft amount=0.6% by weight). The maleic anhydride-modified polypropylene resin was prepared by the method described in JP-A-2002-308947.

In addition, the long-fiber-reinforced pellets (E-1) were mixed in a composition given in Table 2 and then injection molded into a sample. The tensile strength, IZOD impact strength and gloss of the sample are shown in Table 2. The glass fibers in the resulting sample had a weight average length of 4 mm. In the mixing with the pellets (E-1), the crystalline thermoplastic resin (B-1) having a crystallization temperature (Tc) lower than that of the component (A) by 10° C. or more was FINAPLAS 1751 (MFR=25 g/10 min, crystallization temperature (Tc)=79° C., [rrrr]=0.77) manufactured by Atofina Chemicals, Inc.

Comparative Example 1

A sample was prepared in the same manner as Example 1 except that a crystalline thermoplastic resin (A-2) was used instead the crystalline thermoplastic resin (B-1) having a crystallization temperature (Tc) lower than that of the component (A-1) by 10° C. or more used in the mixing with the pellets (E-1). The glass fibers in the resulting sample had a weight average length of 4 mm. The crystalline thermoplastic resin (A-2) was a propylene homopolymer (MFR=25 g/10 min, crystallization temperature (Tc)=128° C.).

Example 2

According to the method described in JP-A-121146, long-fiber-reinforced pellets (E-2) were prepared in a composition given in Table 3. The pellets contained glass fiber in a content of 60% by weight and were 9 mm long. In the preparation of the pellets, the crystalline thermoplastic resin (A-3) was a propylene homopolymer (MFR=120 g/10 min, crystallization temperature (Tc)=122° C.) and the modified polyolefin resin (D-2) was a maleic anhydride-modified polypropylene (MFR=40 g/10 min, maleic anhydride graft amount=0.2% by weight). Further, the resulting long-fiber-reinforced pellets (E-2) and a thermoplastic resin (B-1) having a crystallization temperature Tc lower than the component (A-3) by 10° C. or more were mixed in the composition given in Table 4 and then injection molded into a sample. The gloss of the resulting sample is shown in Table 4. The gloss of the resulting sample is shown in Table 4. In the sample, the glass fiber had a weight average length of 1.7 mm.

Comparative Example 2

A sample was prepared in the same manner as Example 2 except that a crystalline thermoplastic resin (A-2) was used instead the crystalline thermoplastic resin (B-1) having a crystallization temperature (Tc) lower than that of the component (A-3) by 10° C. or more used in the mixing with the pellets (E-2). In the sample, the glass fiber had a weight average length of 1.7 mm.

Example 3

According to the method described in JP-A-121146, long-fiber-reinforced pellets (E-3) were prepared in a composition given in Table 1. The pellets contained glass fiber in a content of 40% by weight and were 9 mm long. In the preparation of the pellets, the crystalline thermoplastic resin (A-3) was a propylene homopolymer (MFR=120 g/10 min, crystallization temperature (Tc)=122° C.) and the crystalline thermoplastic resin (B-1) having a crystallization temperature (Tc) lower than that of the component (A-3) by 10° C. or more was FINAPLAS 1751 (MFR=25 g/10 min, crystallization temperature (Tc)=79° C., [rrrr]=0.77) manufactured by Atofina Chemicals, Inc.

In addition, the long-fiber-reinforced pellets (E-3) were injection molded into a sample. The tensile strength, IZOD impact strength and gloss of the sample are shown in Table 2. In the sample, the glass fiber had a weight average length of 4 mm.

Comparative Example 3

A sample was obtained in the same manner as Example 2 except that a crystalline thermoplastic resin (A-2) was used instead the crystalline thermoplastic resin (B-1). In the sample, the glass fiber had a weight average length of 4 mm. The crystalline thermoplastic resin (A-2) used was a propylene homopolymer (MFR=25 g/10 min, crystallization temperature (Tc)=128° C.).

Example 4

According to the method described in JP-A-121146, long-fiber-reinforced pellets (E-4) were prepared in a composition given in Table 1. The pellets contained glass fiber in a content of 40% by weight and were 9 mm long. Further, the resulting long-fiber-reinforced pellets (E-4) and a thermoplastic resin (B-1) having a crystallization temperature Tc lower than the component (A) by 10° C. or more were mixed in the composition given in Table 5 and then injection molded into a sample. The gloss of the resulting sample is shown in Table 5. In the sample, the glass fiber had a weight average length of 4 mm.

Comparative Example 4

A sample was prepared in the same manner as Example 4 except that a crystalline thermoplastic resin (A-2) was used instead the crystalline thermoplastic resin (B-1). In the resulting sample, the glass fiber had a weight average length of 4 mm.

TABLE 1

| | Long-fiber-reinforced pellets | | |
|---|---|---|---|
| | (E-1) | (E-3) | (E-4) |
| (A) Crystalline thermoplastic resin | | | |
| Sort of resin | A-1 | A-2 | A-3 |
| Amount (parts by weight) | 47 | 50 | 50 |
| Sort of resin | | | A-2 |
| Amount (parts by weight) | | | 10 |
| (B) Thermoplastic resin having a crystallization temperature Tc lower than that of component (A) by 10° C. or more | | | |
| Sort of resin | | B-1 | |
| Amount (parts by weight) | | 10 | |
| (C) Fiber | | | |
| Sort of fiber | C-1 | C-1 | C-1 |
| Amount (parts by weight) | 50 | 40 | 40 |
| (D) Modified polyolefin resin | | | |
| Sort of resin | D-1 | | |
| Amount (parts by weight) | 3 | | |

A-1: Propylene homopolymer (MFR = 80 g/10 min, crystallization temperature (Tc) = 127° C.)
A-2: Propylene homopolymer (MFR = 25 g/10 min, crystallization temperature (Tc) = 128° C.)
A-3: Propylene homopolymer (MFR = 120 g/10 min, crystallization temperature (Tc) = 122° C.)
C-1: Glass fiber (diameter = 16 μm)
D-1: Maleic anhydride-modified polypropylene resin (MFR = 60 g/10 min, the amount of maleic anhydride grafted = 0.6% by weight)

TABLE 2

| | Example | | Comparative Example | |
|---|---|---|---|---|
| | 1 | 3 | 1 | 3 |
| (A) Crystalline thermoplastic resin | | | | |
| Sort of resin | | | A-2 | |
| Amount (parts by weight) | | | 20 | |
| (B) Thermoplastic resin having a crystallization temperature Tc lower than that of component (A) by 10° C. or more | | | | |
| Sort of resin | B-1 | | | |
| Amount (parts by weight) | 20 | | | |
| (E) Long-fiber-reinforced pellets | | | | |
| Sort of resin | E-1 | E-3 | E-1 | E-4 |
| Amount (parts by weight) | 80 | 100 | 80 | 100 |
| Composition Component (A) | 38 | 50 | 58 | 60 |
| (parts by weight) Component (B) | 20 | 10 | — | |

TABLE 2-continued

| | | Example | | Comparative Example | |
|---|---|---|---|---|---|
| | | 1 | 3 | 1 | 3 |
| | Component (C) | 40 | 40 | 40 | 40 |
| | Component (D) | 2 | | 2 | |
| Evaluations | Tensile strength (MPa) | 146 | 95 | 133 | 96 |
| | IZOD impact strength (KJ/m$^2$) | 29 | 33 | 24 | 32 |
| | Gloss (%) | 36 | 28 | 30 | 24 |

A-2: Propylene homopolymer (MFR = 25 g/10 min, crystallization temperature (Tc) = 128° C.)
B-1: FINAPLAS 1751 (MFR = 25 g/10 min, crystallization temperature (Tc) = 79° C.) manufactured by Atofina Chemicals, Inc.
E-1: Long-fiber-reinforced pellets (The long-fiber-reinforced pellets (E-1) described in Table 1 were used.)

TABLE 3

| | Long-fiber-reinforced pellets (E-2) |
|---|---|
| (A) Crystalline thermoplastic resin | |
| Sort of resin | A-3 |
| Amount (parts by weight) | 36 |
| (C) Fiber | |
| Sort of fiber | C-1 |
| Amount (parts by weight) | 60 |
| (D) Modified polyolefin resin | |
| Sort of resin | D-2 |
| Amount (parts by weight) | 4 |

A-3: Propylene homopolymer (MFR = 120 g/10 min, crystallization temperature (Tc) = 122° C.)
C-1: Glass fiber (diameter = 16 μm)
D-2: Maleic anhydride-modified polypropylene resin (MFR = 40 g/10 min, the amount of maleic anhydride grafted = 0.2% by weight)

TABLE 4

| | | Example 2 | Comparative Example 2 |
|---|---|---|---|
| A) Crystalline thermoplastic resin | | | |
| Sort of resin | | A-2 | |
| Amount (parts by weight) | | 20 | |
| (B) Thermoplastic resin having a crystallization temperature Tc lower than that of component (A) by 10° C. or more | | | |
| Sort of resin | | B-1 | |
| Amount (parts by weight) | | 20 | |
| (E) Long-fiber-reinforced pellets | | | |
| Sort of resin | | E-2 | E-2 |
| Amount (parts by weight) | | 33 | 33 |
| Composition (parts by weight) | Component (A) | 12 | 79 |
| | Component (B) | 67 | — |
| | Component (C) | 20 | 20 |
| | Component (D) | 1 | 1 |
| Evaluation | Gloss (%) | 80 | 61 |

B-1: FINAPLAS 1751 (MFR = 25 g/10 min, crystallization temperature (Tc) = 79° C.) manufactured by Atofina Chemicals, Inc.
A-2: Propylene homopolymer (MFR = 25 g/10 min, crystallization temperature (Tc) = 128° C.)
E-2: Long-fiber-reinforced pellets (The long-fiber-reinforced pellets (E-2) described in Table 3 were used.)

TABLE 5

| | | Example 4 | Comparative Example 4 |
|---|---|---|---|
| (A) Crystalline thermoplastic resin | | | |
| Sort of resin | | A-2 | A-2 |
| Amount (parts by weight) | | 25 | 50 |
| (B) Thermoplastic resin having a crystallization temperature Tc lower than that of component (A) by 10° C. or more | | | |
| Sort of resin | | B-1 | |
| Amount (parts by weight) | | 25 | |
| (E) Long-fiber-reinforced pellets | | | |
| Sort of resin | | E-4 | E-4 |
| Amount (parts by weight) | | 50 | 50 |
| Composition (parts by weight) | Component (A) | 55 | 80 |
| | Component (B) | 25 | |
| | Component (C) | 20 | 20 |
| | Component (D) | | |
| Evaluation | Gloss (%) | 34 | 30 |

It is seen that in Example 1, which meets the requirements of the present invention, the gloss was improved and the appearance was greatly improved without deterioration of tensile strength and IZOD impact strength.

In addition, it is seen that in Example 2, which meets the requirements of the present invention, the gloss was improved and the appearance was greatly improved.

It is also seen that in Comparative Examples 1 and 2, which do not contain a component (B) having a crystallization temperature Tc lower than that of component (A) by 10° C. or more, which is one of the requirements of the present invention, molded articles were unsatisfactory in appearance.

As described in detail above, according to the present invention, a fiber-crystalline thermoplastic resin composite material and its pellet from which molded articles having superior mechanical strength and superior appearance can be obtained.

What is claimed is:

1. A composite material comprising: resin (I) comprising 10 to 99% by weight of a crystalline thermoplastic resin which is defined as component (A), and 1 to 90% by weight of a crystalline thermoplastic resin having a crystallization temperature lower than that of component (A) by at least 10° C., which resin is defined as component (B), and 5 to 400 parts by weight, based on 100 parts by weight of the resin (I), of fiber, which is defined as component (C), wherein the contents of the component (A) and the component (B) are each based on a combined content of these two components,
    wherein each of the components (A) and (B) is a polypropylene resin, and
    the crystallization temperature of the component (B) is 100° C. or lower.

2. The composite material according to claim 1, wherein at least one of the component (A) and the component (B) is a polypropylene resin partially or entirely modified with an unsaturated carboxylic acid or its derivative.

3. A composite material comprising: resin (II) comprising a crystalline thermoplastic resin which is defined as component (A), a crystalline thermoplastic resin having a crystallization temperature lower than that of component (A) by at least 10° C., which is defined as component (B), and a modified polyolefin resin partially or entirely modified with an unsaturated carboxylic acid or its derivative, which resin is defined as component (D), and 5 to 400 parts by weight, based on 100 parts by weight of the resin (II), of fiber, which is defined as component (C), wherein in the resin (II) the weight proportions of the component (A) and the component (B) are, respectively, 10 to 99% by weight and 1 to 90% by weight, each based on a combined amount of these two components, and wherein the ratio of the weight of the component (D) to a combined weight of the components (A) and (B) is from 0.1/99.9 to 20/80, wherein each of the components (A) and (B) is a polypropylene resin, and the crystallization temperature of the component (B) is 100° C. or lower.

4. The composite material according to claim 1 or 3, wherein the component (B) has a melt flow rate (230° C., 21.2 N) of from 1 to 300 g/10 min.

5. The composite material according to claim 1 or 3, wherein the component (B) is a polypropylene resin having a syndiotactic structure.

6. The composite material according to claim 1 or 3, wherein the fiber (component (C)) has a weight average fiber length of 2 to 100 mm.

7. A pellet obtained from the composite material according to claim 1 or 3, wherein the pellet is 2 to 50 mm long and the fiber (component (C)) contained in the pellet has a weight average length equal to the length of the pellet.

8. A molded article obtained from the composite material according to claim 1 or 3, wherein the fiber (component (C)) in the molded article has a weight average length of 1 mm or more.

9. The composite material according to claim 4, wherein the component (B) is a polypropylene resin having a syndiotactic structure.

10. A molded article obtained from the pellet according to claim 7, wherein the fiber (component (C)) in the molded article has a weight average length of 1 mm or more.

* * * * *